(12) United States Patent
Albach

(10) Patent No.: US 6,921,546 B2
(45) Date of Patent: Jul. 26, 2005

(54) ANTIMICROBIAL GLASS AND GLASS-LIKE PRODUCTS AND METHOD OF PREPARING SAME

(75) Inventor: Eberhard R. Albach, Madisonville, TN (US)

(73) Assignee: Gemtron Corporation, Sweetwater, TN (US)

( * ) Notice: Subject to any disclaimer, the term of this patent is extended or adjusted under 35 U.S.C. 154(b) by 0 days.

(21) Appl. No.: 10/368,591

(22) Filed: Feb. 20, 2003

(65) Prior Publication Data

US 2004/0166173 A1 Aug. 26, 2004

(51) Int. Cl.[7] .................. A01N 59/16; A01N 55/02; C03B 27/012; C03C 17/10
(52) U.S. Cl. .................. 424/618; 65/60.4; 65/60.57; 65/114; 514/495
(58) Field of Search .................. 424/618; 514/495; 65/60.4, 60.57, 114

(56) References Cited

U.S. PATENT DOCUMENTS

| | | |
|---|---|---|
| 2,785,153 A | 3/1957 | Locke et al. |
| 4,440,810 A | 4/1984 | Forker, Jr. |
| 4,507,392 A | 3/1985 | Rittler |
| 5,085,416 A | 2/1992 | Miyake et al. |
| 6,197,366 B1 | 3/2001 | Takamatsu |
| 6,238,686 B1 | 5/2001 | Burrell et al. |
| 6,264,936 B1 | 7/2001 | Sawan et al. |
| 6,383,273 B1 | 5/2002 | Kepner et al. |
| 6,509,057 B2 * | 1/2003 | Shigeru et al. ............... 427/11 |
| 2002/0112760 A1 | 8/2002 | Usabiaga |

FOREIGN PATENT DOCUMENTS

| | | |
|---|---|---|
| JP | 04-338138 | 11/1992 |
| JP | 07-48142 | 2/1995 |
| JP | 07-300339 | 11/1995 |
| JP | 10-158037 | 6/1998 |
| WO | WO 92/13491 | 8/1992 |

* cited by examiner

Primary Examiner—S. Mark Clardy
Assistant Examiner—Frank Choi
(74) Attorney, Agent, or Firm—Diller, Ramik & Wight

(57) ABSTRACT

A glass or glass-like substrate having a contact-killing, non-leaching antimicrobial effective amount of metal ions contained in at least one surface region thereof, and having a color of $b^* \leq +6$ on the CIE international color scale is disclosed. The antimicrobial substrate is prepared by providing a metal ion precursor comprising at least one source of antimicrobial effective metal ions dissolved or otherwise dispersed in a carrier material; depositing the precursor onto at least one surface of the substrate; drying the substrate at a temperature of from about 20° C. to about 105° C. by removing volatiles from the metal ion precursor; and heating the resulting substrate at a temperature of about 600–650° C. for 2–5 min. to exchange or otherwise implant antimicrobial metal ions from the precursor and into the glass or glass-like substrate.

18 Claims, No Drawings

ANTIMICROBIAL GLASS AND GLASS-LIKE PRODUCTS AND METHOD OF PREPARING SAME

FIELD OF THE INVENTION

This invention relates to glass and glass-like substrates having a contact-killing, non-leaching effective amount of an antimicrobial effective amount of metal ions contained in at least one surface region thereof, and to methods of preparing such glass substrates. In a particular aspect, the invention relates antimicrobial sheets or plates of glass or glass-like materials having silver ions concentrated in at least one surface region thereof. In still another aspect, the invention relates to glass and glass-like articles having antimicrobial food contacting surfaces, e.g., glass and ceramic food trays, glass and ceramic food cutting boards, ceramic cooktops and counter tops, glass and ceramic eating and drinking utensils or the like, and to methods of preparing them.

BACKGROUND OF THE INVENTION

The use of certain metal ions as antibacterial and antimicrobial agents is known in the art. For example, in the medical community, it is known to incorporate metal ions such as silver ions, copper ions and zinc ions into and/or onto medical devices and appliances such as orthopedic pins, plates and implants, wound dressings, urinary catheters, and the like to guard against infections. Typically, these metal ions, and particularly silver ions because of their unusually effective bioactivity at low concentrations, have been incorporated into and/or onto the medical devices both as inorganic and/organic soluble salts that are intended to leach from the devices during use to prevent and treat microbial infections. While metal ions in the form of soluble salts are effective for controlling microbial infections, they do not provide prolonged protection due to the gradual loss during use. Accordingly, additional metal ions must be reapplied at frequent intervals to maintain the effectiveness of the antimicrobial activity, and this is often very difficult, particularly where an in-dwelling or implanted medical device is involved.

As a result, there have been attempts to prepare medical devices that involve the use of low solubility compounds and/or complexes of metal ions, particularly silver ions, which leach from the devices during use at a relatively slow rate. For example, U.S. Pat. No. 2,785,153 suggested using a colloidal silver protein for this purpose. Such compounds typically would be formulated as creams and would be applied as coatings. While the release of silver ions from such formulations is quite slow, the coatings from such formulations have witnessed little practical use due to adhesion, abrasion resistance and shelf life problems.

The use of silver metal coatings for antimicrobial purposes also has been suggested. However, it is generally accepted that such coatings do not provide the required level of efficacy, since the diffusion of silver ions from the metallic coating is negligible. One attempt at improving the antimicrobial utility of silver metal coatings is disclosed in U.S. Pat. No. 6,238,686. In that patent, it is suggested to deposit the metal coating by vapor deposition techniques to produce atomic disorder in the coating such that a sustained release of metal ions sufficient to produce an antimicrobial effect is achieved. Among the numerous patent publications suggesting the use of silver metal and/or silver ions in medical devices and appliances there may be listed U.S. Pat. No. 6,264,936, U.S. Published Patent Application 2002/0073891, and PCT International Publication WO 92/13491.

The use of metal ions as an antimicrobial agent is also known outside of the medical arts. For example, U.S. Pat. No. 6,383,273 discloses a process for producing a catalyst and/or adsorbent composition that contains a colloidal metal oxide or colloidal metalloid oxide binder, a support, such as a polymer, carbon, a cellulosic fiber or a metal oxide, which can absorb and/or adsorb an antimicrobial agent, and an antimicrobial agent, such as silver nitrate or copper nitrate. The antimicrobial compositions disclosed in that patent are said to be useful for reducing or eliminating the amount of bioactive agent or contaminant in a variety of environments, such as water and air.

The use of metal ions to produce antimicrobial glass compositions also is known. For example, in Japanese Publication 10-158037, it is disclosed to prepare an antimicrobial glass by exchanging alkali metal ions in the glass with silver ions. This is accomplished by dipping a glass substrate into a bath of molten salt that contains substantial silver. The bath temperature higher than the melting point of the silver salt, but lower than the glass transition temperature of substrate. In the examples of this publication, the temperature at which the fused salt bath was heated ranged from 240° C., when using silver nitrate as the fused salt, to 480° C., when using silver chloride as the fused salt; and while it is not completely clear, it appears that the period for which the glass substrates were dipped into a fused salt bath and heated in a platinum crucible ranged from a period of from about 30 minutes to about 40 hours, depending upon the identity of the fused salt.

In Japanese Publication 04-338138, it is taught to produce an antibacterial glass powder by heating the glass powder to near its glass transition temperature and then dipping the heated glass powder into an ion exchange solution, e.g., an aqueous solution of a silver salt or copper salt, to exchange silver ions or copper ions for sodium ions initially present in the glass powder. This publication is discussed in Japanese publication 10-158037, where it is stated, in effect, that while the process might be capable of producing antimicrobial glass powder, it is unsuitable for producing antimicrobial glass sheets or plates because the process is incapable of producing sheets or plates having a uniform concentration of metal ions, e.g., silver ions or copper ions, in the front surface of the glass because of the surface tension of the ion exchange solution. A more fundamental reason why this process is not suitable for producing antimicrobial sheets or plates of glass is that the glass sheets or plates that are heated to near their glass transition temperature will explode upon insertion into the aqueous solution.

Other Japanese publications that relate generally to antimicrobial glass compositions include Japanese Publication 07-300339 and Japanese Publication 07-048142. Both of these publications, however, relate to the production of silver containing glass compositions wherein the silver component is introduced as part of the batch material that is used to form the glass. Moreover, the 07-300399 publication relates to antibacterial glass compositions that are rich in $CaO$, $MgO$ and $P_2O_5$, rather than to more conventional soda lime glasses.

U.S. Pat. No. 4,507,392 relates to transparent glass-ceramics designed for application as glazes to low expansion ceramic bodies. The transparent glass-ceramics, which are not said to contain silver ions or any other antimicrobial metal ions, may be applied to the glass ceramic substrates by any means conventional in the art, such as by dipping, silk screening and spraying. Silk screening is said to be the preferred method of applying the glaze compositions. In that method, the glaze is applied as a paste comprised of glass-ceramic fritted glass, and optional pigments, in a non-aqueous vehicle consisting of a silk screening oil base and a volatile solvent. After screening the paste on the substrate, the paste is dried and then fired to fuse the particles to a smooth glaze or enamel. U.S. Pat. No. 4,440,810 is anther patent that relates to depositing glazes on glass substrates. In that patent, it is disclosed that a non-aqueous suspension of fritted enameling composition can be sprayed onto a ceramic substrate using fluid suspensions of the enamels in a conventional screening oil/solvent vehicle. Conventional screening oils include, for example, pine oil-based and boiled linseed oil-based screening oils or so-called squeegee oil compositions that are well known in the art. Specific screening oil bases that are disclosed in this patent include those which are commercially available from Ciba-Geigy Corporation, Plastics and Additives Division, Ardsley, N.Y. 10502, under the names Darkened 479, Darkened Medium 175, Darkened Medium 324, and Darkened™ screening medium. It will be appreciated that glazes formed by firing glass frits typically will not be transparent, that they are highly susceptible to mechanical damage, and that they would not be suitable for use in preparing antimicrobial food contacting surfaces, such as food cutting boards.

U.S. Pat. No. 6,197,366 discloses coating a glass substrate with a metal paste comprising an organo- or inorganometallic compound that is solid at ordinary temperature, and a viscous amino compound as a medium for the metallic compound. The paste, as a thick film, is applied to the glass substrate and is baked at a relatively low temperature (form 90° C. to 550° C.) to form a metal film in which the metal particles simply make contact. Among the metallic compounds that are disclosed for use in this patent are compounds of palladium, platinum, rhodium, gold, silver, copper, and others. The metal-coated glass substrates are said to be useful, for example, as an electrically conductive material, as a resistor material, as a heat insulating material, as a metal luster material, as a material for decoration or as a material for microbial growth-inhibition. There is no suggestion that transparent, colorless, sliver-coated glass substrates would be prepared by the disclosed process. In fact, examples that disclose the use of a silver compound in the paste formulation, also disclose that the resulting tin-coated glass is colored. See, for example, Examples 15 and 16 (silver-colored film), Example 17 (silver mirror film), Example 18 (slightly yellow-tinted silver film), Example 19 (gray silver film) and Example 20 (mirrored silver-palladium alloy film).

U.S. Pat. No. 5,085,416 relates to a sterilized cooking board comprised of a base board and an organic polymer layer containing an antibacterial zeolite. The polymer layer is formed on the entirety of at least one surface of the base board. The antibacterial zeolite is a zeolite in which a part or all of its exchangeable ions have been exchanged with antibacterial ions, such as silver ions, copper ions or zinc ions. There is no suggestion in this patent of forming the cooking board from an antimicrobial glass.

Published U.S. Patent Application 2002/00112760 relates to an antimicrobial food tray having a surface with which food comes into contact and which contains an inorganic antimicrobial agent, such as silver ions, copper ions, zinc ions or the like. The tray may be formed from a plastic resin that contains the antimicrobial metal ions, or the antimicrobial metal ions may be contained in a coating that is applied to the tray. There is no suggestion of forming the antimicrobial food tray from an antimicrobial glass.

While a number of processes are known for preparing antimicrobial substrates, there exits a need for improved processes that are capable of providing contact-killing, antimicrobial substrates that exhibit long lasting and safe efficacy. There also exists a need for a facile process for producing transparent, essentially colorless glass substrates that contain a contact-killing, non-leaching antimicrobial effective concentration of metal ions, particularly silver ions, in at least one surface region thereof.

SUMMARY OF THE INVENTION

In view of the foregoing and other limitations and disadvantages of the prior art, it is an object of the present invention to provide an improved process for the production of antimicrobial glass and glass-like substrates.

It is another object to provide a process for preparing a transparent, essentially colorless glass substrate having an antimicrobial effective concentration of metal ions in at least one selected surface region thereof.

Yet another object is to provide articles of manufacture having at least one substantially flat glass or glass-like surface having a contact-killing, non-leaching antimicrobial effective amount of metal ions contained therein.

Another object is to provide articles of manufacture, and particularly articles of manufacture that are intended for use as food contacting articles, wherein the articles have at least one food contacting surface that is comprised of a transparent, essentially colorless glass or glass-like material having an antimicrobial effective concentration of metal ions in at least one surface region thereof that is to come into contact with food.

Yet another object is to provide a food supporting tray having a glass or glass-like food contacting surface, wherein the food contacting surface contains an antimicrobial effective concentration of metal ions, especially silver ions, and wherein the glass or glass-like material has a b* color of $\leq +6$.

Still another object is to provide a cutting board having a glass or glass-like surface adapted for supporting and contacting a food product which is to be cut, wherein the food contacting surface contains an antimicrobial effective concentration of metal ions, especially silver ions, and wherein the glass has a b* color of $\leq +6$.

Yet another object is to provide a shelf having a glass or glass-like surface adapted for supporting and contacting an item, particularly food item, wherein the item contacting surface contains an antimicrobial effective concentration of metal ions, especially silver ions, and wherein the glass has a b* color of $\leq +6$.

The above and other objects and advantages of the present invention will become more apparent in light of the following detailed description of certain preferred embodiments thereof.

As used in this specification and claims, a glass substrate, or glass-like substrate, e.g., a ceramic or glass-ceramic substrate, which is essentially colorless is meant to describe a substrate having a b* color of $\leq +6$, and preferably a b* color of $\leq +4$, on the Commission Internationale de l'Eclairage (CIE) international color scale, where b*=0 represents a neutral color and b*=+6 represents a slightly yellow color. The CIE international color scale (conventionally abbreviated as the CIELAB color scale), which was adopted in 1976, is based on L*a*b* color values. The CIELAB color values may be plotted on a 3-dimensional (3-axis) graph, wherein the L* values are measured along the central or Y axis, the a* values along the X axis, and the b* values along the Z axis. The equations used to generate the graph are as follows:

$L^* = 116(Y/Y0)1/3 - 16$, which estimates the appearance of brightness, ranging from black ($L^*=0$) to pure white ($L^*=100$), $a^* = 500[(X/X0)1/3 - (Y/Y0)1/3)]$, which estimates the appearance of red ($a^*$ is positive) to neutral ($a^*=0$) to green ($a^*$ is negative), $b^* = 200[(Y/Y0)1/3 - (Z/Z0)1/3)]$, which estimates the appearance of yellow ($b^*$ is positive) to neutral ($b^*=0$) to blue ($b^*$ is negative).

In accordance with the CIELAB color scale, nominally white color stimulus is defined as Y0, X0, Z0, wherein Y0=100 and Y/Y0, X/X0 and Z/Z0>0.01. As the Y axis is approached, color disappears and shades of "gray" are observed.

The values on the CIELAB color scale are a measure of the number of standard illuminants observed by means of conventional visible reflectometers, such as the Macbeth™ spectrophotometer, available from Gretamacbeth LLC, New Windsor, N.Y., and the Spectrogard™ spectrophotometer, available from Byk Gardner, Inc., Silver Spring, Md. The Macbeth™ and Spectrogard™ spectrophotometers are commonly used competitive specialized spectrophotometers that estimate color from measured reflected or transmitted visible light data. These systems have three major components, namely: spectrophotometer, computer and data system. In essence, the computer launches a specific color method, operates the photometer and collects the spectral data. The data system reduces the data to color in any specified color system of which CIELAB is one such system.

DETAILED DESCRIPTION

In one preferred aspect, the invention relates to a method for preparing a transparent, essentially colorless glass or glass-like substrate having a contact-killing, non-leaching antimicrobial effective concentration of metal ions, such as silver ions, copper ions, zinc ions or the like, and particularly silver ions, in at least one surface region thereof. The method broadly comprises the steps of depositing a precursor of antimicrobial metal ions onto at least one surface region of a glass or glass-like substrate; drying the substrate, for example, by exposing to substrate to ambient air, e.g., at 20–30° C.) until the volatiles in the metal ion precursor have evaporated, or, more preferably, by heating the substrate to a temperature sufficient to drive off any volatiles contained in the antimicrobial metal ion precursor, typically from about 30 to about 105° C.; and then heating the resulting substrate to a temperature of about 600° C. to about 650° C. for a short period of time, e.g., from about 2 min. to about 5 min., to exchange antimicrobial metal ions for alkali metal ions or alkaline earth metal ions or to otherwise implant or insert antimicrobial metal ions into the surface regions of the substrate on which the metal ion precursor had been deposited. Upon cooling to ambient temper, the substrate is toxic to microbial life and is essentially colorless, i.e., the glass or glass-like substrate, e.g., a ceramic or glass-ceramic substrate, exhibits a neutral ($b^*=0$ on the Commission Internationale de l'Eclairage (CIE) international color scale) to slightly yellow-tan hue ($b^* \leq +6$, and preferably $\leq +4$).

The fact that antimicrobial substrates produced in accordance with this invention are essentially colorless is a characteristic that distinguishes the present invention from the prior art, particularly in cases where silver has been used as a source of antimicrobial metal ions. Normally, adsorbed silver is a strong chromophore, resulting in glass or glass-like substrates that exhibit a color ranging from slightly yellow to brown ($b^* \geq +6$, and typically as high as about 40). As indicated above, and as will be shown more fully in the examples which follow, antimicrobial substrates prepared in accordance with the present invention always exhibit a neutral ($b^*=0$) to slightly yellow color ($b^* \leq +6$, and preferably $\leq +4$). Thus, when compared with prior art processes, the present invention provides a practical means for controlling the color of glass or glass-like substrates containing antimicrobial metal ions.

The precursor of antimicrobial metal ions comprises a metal compound, typically a salt, complex or the like, dissolved or otherwise dispersed in a compatible carrier material, wherein the metal compound is capable of exchanging antimicrobial metal ions for metal ions, e.g., sodium ions, contained in the glass or glass-like substrate or is otherwise capable of inserting antimicrobial metal ions into the surface regions of the substrate. Metal compounds that may be employed in this invention include, for example, compounds of silver, copper, zinc or the like, which are known to kill or at least inhibit microbial growth. However, compounds of silver are the preferred antimicrobial compounds for use in this invention because of their unusually effective bioactivity at low concentrations. Silver compounds that may be employed include organic and inorganic silver compounds, for example, silver nitrate, silver chloride, silver fluoride, silver bromide, silver oxide, silver sulfate, silver carbonate, silver cyanide, silver tetrafluoroborate, silver sulfide, silver acetate, silver lactate, silver benzoate, silver cyclohexanebutyrate, silver diethyldithiocarbamate, silver trifluoromethanesulfonate and mixtures thereof.

The carrier material or vehicle for the metal compound generally would comprise any liquid or liquid-based material that is capable of dissolving or otherwise dispersing or suspending the metal compound, such that the carrier material and metal compound may be held in contact with the substrate during the ion exchange or ion insertion treatment. The carrier material may comprise water-based materials, such as thickened latexes of acrylates, acrylamides or polyamides or the like. However, non-aqueous, relatively nonvolatile, oily carrier materials are preferred over aqueous materials, including water, per se, because they tend to be more viscous and because their surface tension characteristics generally lend themselves more favorably toward maintaining uniform contact between the source of antimicrobial metal ions and the substrate during the entire ion exchange or ion insertion treatment. Non-aqueous materials also tend to contain a lower concentration of volatiles, thus making them less likely to boil or spatter during the treating process.

Thus, while a wide variety of carrier materials may be employed, preferred carrier materials include, among others, terpene alcohols; glycols, such as ethylene glycol, propylene glycol or the like; polyglycols, such as diethylene glycol, dipropylene glycol, polyethylene glycols, polypropylene glycols or the like; glycol ethers, such as ethylene glycol monobutyl ether, dipropylene glycol monomethyl ether or the like; terpene hydrocarbons; paraffinic hydrocarbons, including isoparaffinic hydrocarbons; aromatic naphthas, such as V&P Naphtha; benzene and substituted benzenes, such as xylene, ethyl benzene, toluene or the like; ketones, such as 4-hydroxy-4-methyl-2-pentanone; alkoxyalkanol esters, such as 2-butoxyethanol acetate; alkoxy alkanols, such as N-propoxy propanol; and a variety of conventional organic solvent and oily materials, including, for example, mineral spirits, pine oil, boiled linseed oil, cellulose ethers, and mixtures thereof. The carrier materials optionally may contain one or more conventional auxiliary additives, including agents, such as polysaccharides, cellulose esters, waxes, polyvinyl alcohol and styrene copolymers; surface tension modifying agents, such as sulfosuccinates, deionic, anionic and nonionic surfactants, long-chain and branched aliphatic alcohols and oleates; and solvent vehicles, such as methanol or ethanol or the like.

Among the more preferred non-aqueous carrier materials contemplated for use in this invention, are those materials that are commonly referred to as silk screening oils, or simply as screening oils or squeegee oils. Screening oils, which typically comprise a mixture of one or more relatively non-volatile oily or resinous substances, such as pine oil or boiled linseed oil or oil-soluble acrylic resins, in combination with one or more relatively volatile solvent vehicles, such as methanol, ethanol acetone, mineral spirits, 2-butoxyethanol acetate or the like, are well suited for controlled application to the glass substrate by means of conventional spraying and silk screening techniques. Commercially available screening oils that may be used in the present invention include, for example, boiled linseed oil and boiled linseed oil-based screening oils, Ferro C38™ (available from Ferro Corp., commonly referred to as "C38 screening oil" and formulated from terpene alcohols, glycol ethers, terpene hydrocarbons and isoparaffinic hydrocarbons) and CERDEC 1620™ (available from Ferro Corp., formerly Cerdec Corp., and formulated from terpene hydrocarbons, ester alcohols and acrylic resins). Other conventional screening oils are disclosed in U.S. Pat. No. 4,440,810, and include, for example, screening oils available under the names Drakenfeld 479™ (formulated from a pine oil base), Drakenfeld Medium 175™, Drakenfeld Medium 324™ and Drakolene™ screening material from Ciba-Geigy Corporation, Plastics and Additives Division, Ardsley, N.Y. 10502.

The metal ion precursor materials may be applied to the surface of the glass or glass-like substrate in any convenient manner, such as, for example, by dipping, spraying, screening, brushing or the like techniques. However, depending, for example, on the viscosity and/or surface tension of a given precursor material, applying the precursor to a glass substrate by a dipping or a spraying technique generally is less preferred because those application techniques tend to result in the precursor material running, dripping or otherwise distributing unevenly on the substrate, which, in turn, results in a treated substrate having an uneven bioactivity and color across its surface regions. Preferred methods of applying the metal ion precursor materials are by brushing or screening, e.g., silk screening, the precursor material onto the surface of the glass or glass-like substrate.

Brushing or screening techniques, which generally use relatively viscous, oily carrier materials, enable the substrate to be coated with the precursor material, either its entirety, or in a selected pattern, in a controlled manner. Moreover, a screened or brushed coating will not tend run or drip, and thus will facilitate a subsequent low temperature heating step, during which the volatiles are driven off leaving the residue of the precursor material essentially dried in place.

When the substrate carrying the dried precursor material is then heated to a temperature of from 600° C. to about 650° C. for a short period of time, e.g., from about 2 min. to about 5 min., the antimicrobial metal ions in the dried precursor material are ion exchanged for alkali metal ions or alkaline earth metal ions in the glass or glass-like surface regions, or are otherwise implanted into the surface regions.

Any residue from the dried precursor material that is not decomposed and burned off the substrate during the ion exchange heating step, generally is completely removed during the ensuing antimicrobial tempering process. Tempering the antimicrobial glass or glass-like substrate typically is achieved by first heating the antimicrobial substrate to a temperature of at about 610° C. or slightly higher, and then immediately passing the heated substrate into an airblast head thereby to cool the substrate quickly to ambient conditions.

The concentration of the source of antimicrobial metal ions in the precursor material may vary over wide limits depending, in part, on the particular metal compounds and the particular carrier materials involved. However, the identity and relative concentrations of the source of metal ions and the carrier material in the precursor materials are important only to the extent that the precursors are capable of exchanging or otherwise implanting an antimicrobial effective concentration of metal ions into the surface regions of the substrate during the present treatment process. Typically, a concentration of metal compound in the range of from about 0.01 to about 1.0%, by weight, and preferably from about 0.25 to about 0.50%, by weight, based on the total weight of the metal compound and carrier material, will be adequate to provide an antimicrobial effective concentration in the surface regions of a glass or glass-like substrate in accordance with the invention.

The term "antimicrobial effective concentration", as used in this specification and claims, means that ions, atoms, molecules and/or clusters of the antimicrobial metal which has been exchanged or otherwise implanted into the surface regions of the glass or glass-like substrate are present in the surface regions of the substrate in a concentration such that they are released from the surface of the substrate at a rate and in a concentration sufficient to kill, or at least to inhibit microbial growth, on contact.

In another embodiment of the invention, there is provided an article, particularly an article that is intended to contact food, such as a tray, shelf, cooktop, countertop, eating or drinking utensil, cutting board, or the like having an essentially colorless, non-leaching, antimicrobial glass or glass-like surface. The articles may have generally flat or configured surfaces as their particular end use dictates. However, in each case, the antimicrobial glass or glass-like surface or surfaces preferably would be prepared in accordance with the process of the invention. Among the antimicrobial articles contemplated by this invention there may be included, for example, antimicrobial refrigerator trays, antimicrobial food serving trays, food cutting boards having an antimicrobial glass or glass-like, e.g., ceramic or glass-ceramic, cutting surface, counter tops having an antimicrobial glass or ceramic surface, glass oven doors and front panels, microwave oven doors, glass components of cooking oven hoods, glass hobs (decorated glass oven tops having large holes for burners), ceramic cookware and cooking surfaces, food vending machines, and so forth. Countless other articles having an antimicrobial glass or glass-like surface, including articles which are not intended primarily for use as food contacting articles, can be envisioned by those of ordinary skill in the art, and all of those articles are within the scope of this invention, provided that an essentially colorless, non-leaching antimicrobial glass or glass-like surface is prepared as taught herein. Examples of such other articles include, but are not limited to antimicrobial bathroom and kitchen wall and floor tiles, mirrors having an antimicrobial glass surface, vending machines having glass or glass-like surfaces, disinfection cabinets having glass or glass-like surfaces, glass surfaces of saunas and tanning booths, medical apparatus, e.g., scales and containers having glass surfaces, touch screens, e.g., of ticket vendors and oven controls, furniture having glass or glass-like surfaces, gambling and gaming devices having glass or glass-like control surfaces, glass shower enclosures and doors; glass containers, particularly for hospital use, such as cups, plates, glasses, syringes; glass laboratory products, such as beakers, test tubes, or the like.

As used in this herein the term "non-leaching antimicrobial glass or glass-like surface" is meant to describe a glass or glass-like surface, e.g., ceramic or glass-ceramic surface, that contains antimicrobial metal ions that are released from the surface at a rate sufficient to render the surface antimicrobially effective, while at the same time being released slowly enough for the glass surface to remain antimicrobially effective for an extended period, e.g., for 10 or 20 years or more, even when subjected to detergent washing, e.g., in a conventional dishwasher The following examples are illustrative of the invention and are intended to give those of ordinary skill in the art a more complete understanding of how the present process and articles of manufacture are to be achieved and evaluated. The examples are intended to be purely exemplary of the invention and are not intended to limit the scope of what the inventors regard as their invention. Efforts have been made to ensure accuracy with respect to numbers (e.g., amounts, temperatures, etc.), but some errors and deviations should be accounted for. Unless indicated otherwise, parts or percentages are parts or percentages by weight, temperature is in ° C. or is ambient temperature, and pressure is at or near atmospheric. In each of the examples, microbial efficacy was determined by confocal microscopy, which, through the use of fluorescence, compared the microbial activity occurring on the surface of an untreated glass substrate (control) with the microbial activity occurring on the surface of glass substrate that has been treated in accordance with each example. The determination of microbial efficacy involved an initial sterilization of the substrate, inoculation of the substrate with microbes, and culturing and staining the inoculated microbes. Staining caused live cells to fluoresce green and dead cells to fluoresce red.

EXAMPLE 1

A silver ion precursor material was prepared by dissolving 0.125 grams of silver nitrate in 7 drops of concentrated ammonia, followed by the addition of the resulting ammonia solution to 50 grams of Ferro C38™ screening oil. The resulting mixture was shaken vigorously for 1 minute and allowed to stand undisturbed for 2 hours, thereby forming a homogeneous dark amber oil. Using a 305-mesh screen, the silver ion precursor material was screened onto a pre-cleaned 3 square inch plate of float glass. The screened float glass was dried at 105° C. for 30 minutes, and then heated to 620° C. for 3 minutes in a vertical tong oven. Upon cooling to ambient temperature, the glass plate was transparent and exhibited a uniform, slight yellow-tan hue (B*<6). When compared with an untreated glass substrate (control) by confocal microscopy, the silver ion treated glass substrate was found to exhibit considerably more red fluorescence, thus showing that the silver treated glass substrate was toxic to microbial life. The untreated glass substrate (control) exhibited almost exclusively green fluorescence, indicating that the untreated glass supported prolific biofilm growth and vibrant planktonic life.

EXAMPLE 2

A silver ion precursor material was prepared by carefully pulverizing 0.125 grams of silver nitrate using a mortar and pestle. 5 drops from a 50 gram batch of Ferro C38™ screening oil were added to the mortar and pulverization was continued until a suspension having a homogeneous milk-like consistency was obtained. The resulting suspension was retrieved and added to the remainder of the 50 grams of screening oil. The resulting mixture was agitated and then left undisturbed for 2 hours, thereby forming a dark amber oil. The dark amber oil was screened onto a pre-cleaned 3 square inch plate of float glass using a 305 mesh screen. The screened float glass was dried at 105° C. for 30 minutes, and then heated to 620° C. for 3 minutes in a vertical tong oven. Upon cooling to ambient temperature, the glass plate exhibited a uniform, slight yellow-tan hue (B*<6) and was found to be toxic to microbial life.

EXAMPLES 3–7 (COMPARATIVE EXAMPLES)

In Examples 3–6, the procedure for exchanging alkali metal ions in the glass with silver ions that was outlined in Japanese publication 10-158037 was followed, except that the glass substrates were dipped and heated in a fused silver nitrate bath only for the time period noted below in Table 1. In each case, the fused silver nitrate was heated to a temperature higher than the melting point of the silver nitrate, but below the glass transition temperature of the glass substrate, as is disclosed in the Japanese publication In Example 7, the procedure of Example 1 was followed, except that 0.028 grams of silver ion precursor was screened onto the glass substrate, and that the dried screened silver ion precursor material was heated for only 2 minutes at 604° C. to prepare a transparent, essentially colorless antimicrobial glass substrate containing about 0.0168 mol % silver nitrate based, on the total weight of the glass substrate and silver nitrate. The temperature of the fused silver nitrate bath and the duration of the dipping/treating step used in Examples 3–6 are set forth in Table 1. For purposes of comparison, the temperature at which the glass substrate containing the dried, screened silver ion precursor material was heated and the duration of the heating step used in Example 7 are also set forth in Table 1.

TABLE 1

| Example No. | Temperature, ° C. | Duration, minutes | Silver ion exchange | Toxic to Microbial life |
| --- | --- | --- | --- | --- |
| 3 | 300 | 3 | no | no |
| 4 | 300 | 30 | no | no |
| 5 | 488 | 3 | no | no |
| 6 | 488 | 30 | yes | yes |
| 7 (present invention) | 604 | 2 | yes | yes |

As can be seen from the data in Table 1, the present invention resulted in the preparation of glass substrate that was toxic to microbial life using a heating/treating step of only two minutes duration, whereas the process disclosed in Japanese publication 10-158037 required a heating/treating step of much longer duration. Moreover, it was found that as the temperature of the fused silver nitrate bath was increased, there was a tendency for the fused silver nitrate to bubble and/or to boil, and to decompose to silver oxide, thereby resulting in a treated glass substrate that was not uniform across its surface area.

Those of ordinary skill in the art will be able to ascertain, using no more than routine experimentation, many equivalents of the specific embodiments of the invention described herein. Those and all other equivalents, are intended to be encompassed by the following claims.

What is claimed is:

1. A method of preparing a tempered glass or glass-like substrate having a contact-killing, non-leaching antimicrobial effective amount of silver ions contained in at least one surface region thereof, which comprises:
   (a) providing a silver ion precursor composition comprising at least one source of antimicrobial effective silver ions dissolved or otherwise dispersed in a oily carrier material;
   (b) depositing said silver ion precursor onto at least one surface of a glass or glass-like substrate;
   (c) drying the substrate to a temperature of from about 20° C. to about 105° C. for a period of time sufficient to remove volatiles originally contained in said silver ion precursor; and
   (d) heating the resulting substrate at a temperature of from about 600° C. to about 650° C. for a period of from about 2 mm. to about 5 mm. to introduce antimicrobial effective silver ions into any surface of the substrate on which said precursor was deposited, thereby forming a transparent, tempered, essentially colorless antimicrobial glass or glass-like substrate having a color of $b^* \leq +6$ on the CIE international color scale.

2. The method according to claim 1, wherein the drying step (c) comprises heating the substrate to a temperature of from about 30° C. to about 105° C. for a period of time sufficient to substantially dry said silver ion precursor originally by driving off volatiles contained therein.

3. The method according to claim 2, wherein said carrier material is selected from the group consisting of terpene alcohols, glycols, polyglycols, glycol ethers, terpene hydrocarbons, paraffinic hydrocarbons including isoparaffinic hydrocarbons, aromatic naphthas, benzene and substituted benzenes, ketones, alkoxyalkanol esters, alkoxy alkanols, mineral spirits, pine oil, boiled linseed oil, cellulose ethers and mixtures thereof.

4. The method according to claim 2, wherein said silver ion precursor has a viscosity and surface tension such that said silver ion precursor will remain substantially in place, without dripping or running, when deposited on a generally horizontally disposed glass or glass-like surface.

5. The method according to claim 2, wherein said silver ion precursor is deposited on the glass or glass-like substrate by means of a screening or brushing technique.

6. The method according to claim 2, wherein said antimicrobial glass or glass-like substrate has a color of $b^* \leq +4$.

7. The method according to claim 1, wherein said source of silver ions is an organic or inorganic silver compound selected from the group of consisting of silver nitrate, silver chloride, silver fluoride, silver bromide, silver oxide, silver sulfate, silver carbonate, silver cyanide, silver tetrafluoroborate, silver sulfide, silver acetate, silver lactate, silver benzoate, silver cyclohexanebutyrate, silver diethyldithiocarbamate, silver trifluoromethanesulfonate and mixtures thereof.

8. The method according to claim 1, wherein said carrier material is selected from the group consisting of terpene alcohols, glycols, polyglycols, glycol ethers, terpene hydrocarbons, paraffinic hydrocarbons including isoparaffinic hydrocarbons, aromatic naphthas, benzene and substituted benzenes, ketones, alkoxyalkanol esters, alkoxy alkanols, mineral spirits, pine oil, boiled linseed oil, cellulose ethers and mixtures thereof.

9. The method according to claim 1, wherein said silver ion precursor has a viscosity and surface tension such that said silver ion precursor will remain substantially in place, without dripping or running, when deposited on a generally horizontally disposed glass or glass-like surface.

10. The method according to claim 1, wherein said silver ion precursor is deposited on the glass or glass-like substrate by means of a screening or brushing technique.

11. The method according to claim 1, wherein said antimicrobial glass or glass-like substrate has a color of $b^* \leq +4$.

12. A tempered glass or glass-like substrate having at least one contact-killing, non-leaching antimicrobial surface region, wherein said substrate has been prepared in accordance with claim 1.

13. A tempered glass or glass-like substrate having at least one contact-killing, non-leaching antimicrobial surface region, wherein said substrate has been prepared in accordance with claim 2.

14. A tempered article of manufacture having at least one contact-killing, non-leaching antimicrobial, tempered glass or glass-like surface region, said surface region having a color of $b^* \leq +6$ on the CIE international color scale, wherein said surface region is at least one substrate prepared in accordance with claim 1.

15. A tempered cutting board having at least one contact-killing, non-leaching antimicrobial, tempered glass or glass-like surface region suitable for supporting a food product to be cut, said cutting board having a color of $b^* \leq +6$ on the CIE international color scale, wherein said surface region is at least one substrate prepared in accordance with claim 1.

16. A tempered cutting board according to claim 15, having a $b^*$ color of $\leq +4$.

17. A tempered glass or glass-like shelf having at least one contact-killing, non-leaching antimicrobial surface region, said shelf having a color of $b^* \leq +6$ on the CIE international color scale, wherein said surface region is at least one substrate prepared in accordance with claim 1.

18. The tempered glass or glass-like shelf according to claim 17, having a color of $b^* \leq +4$.

* * * * *